July 21, 1953　　　O. E. SEIFERTH　　　2,646,357
PACKAGE
Filed April 12, 1950　　　　　　　　　　　3 Sheets-Sheet 1
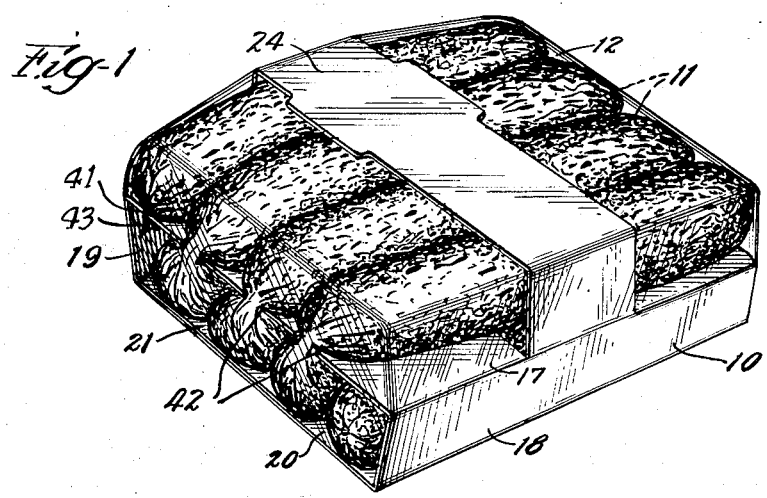
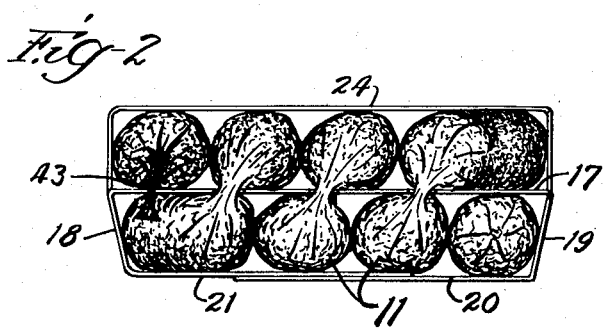
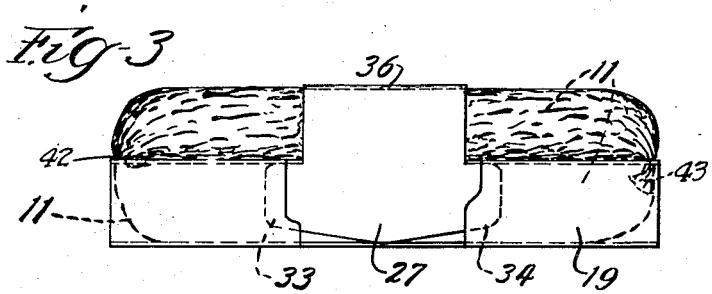
INVENTOR.
Oscar E. Seiferth.
BY
Cromwell, Greist & Warden
Attys.

July 21, 1953   O. E. SEIFERTH   2,646,357
PACKAGE
Filed April 12, 1950   3 Sheets-Sheet 2
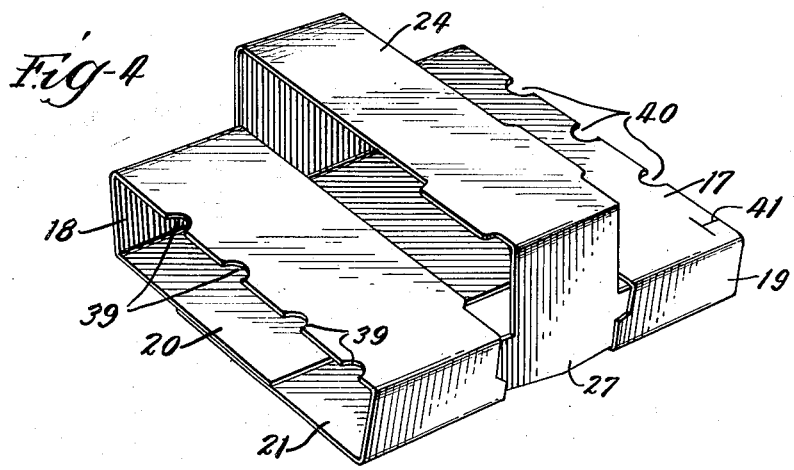
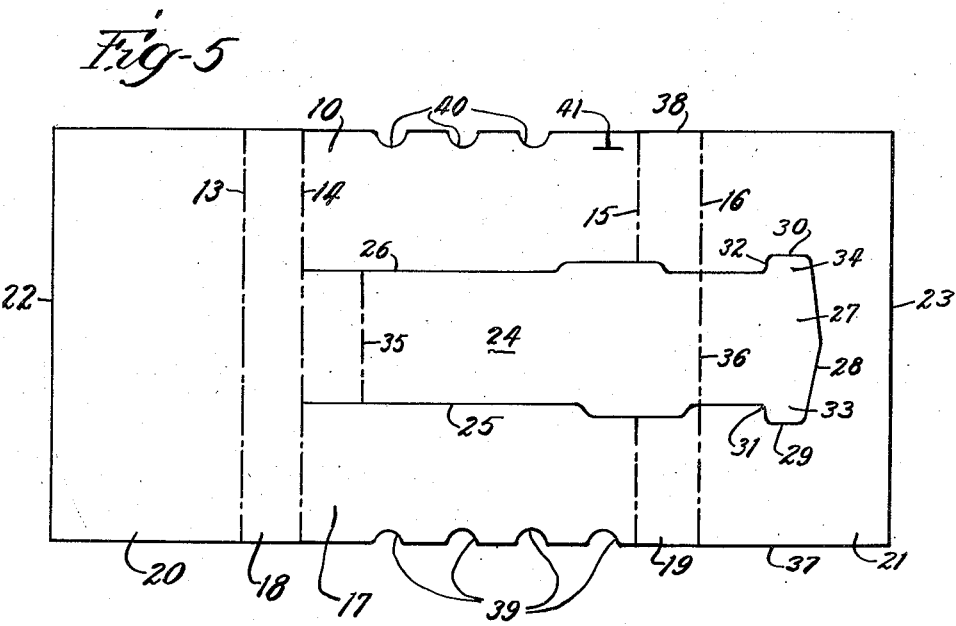
INVENTOR.
Oscar E. Seiferth.
BY
Cromwell, Greist & Warden
Attys.

July 21, 1953     O. E. SEIFERTH     2,646,357
PACKAGE
Filed April 12, 1950     3 Sheets-Sheet 3
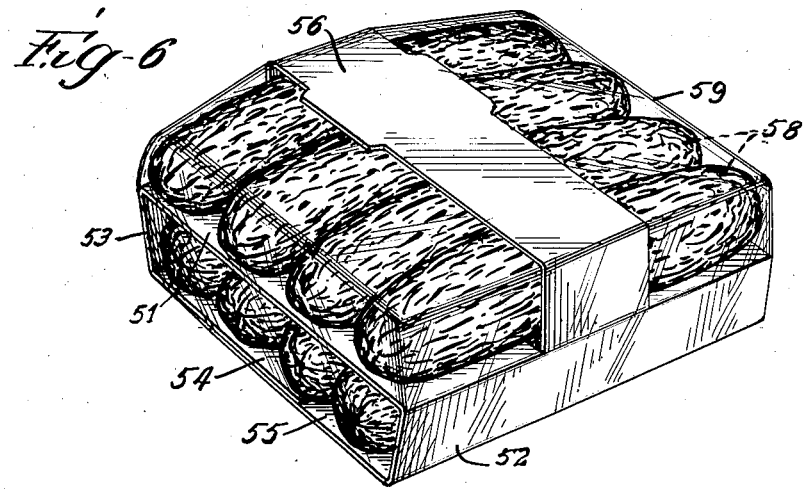
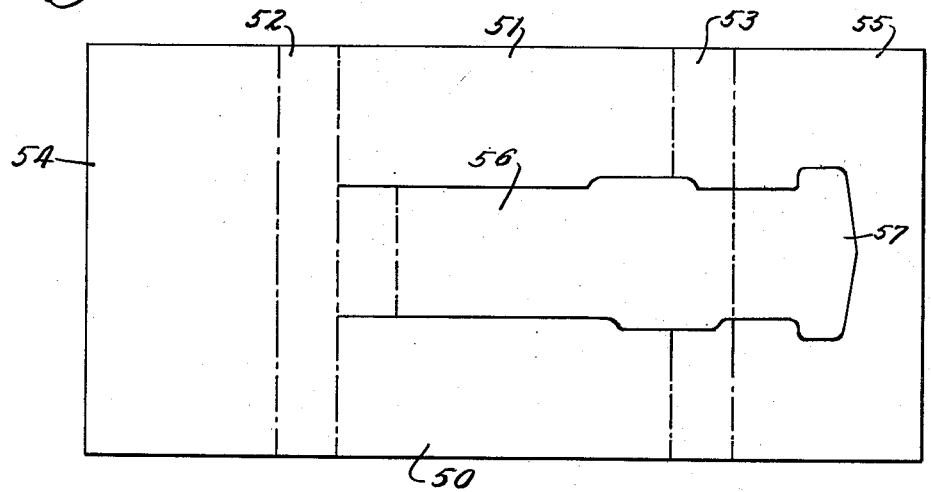
INVENTOR.
Oscar E. Seiferth.
BY
Cromwell, Greist & Warden
Attys.

Patented July 21, 1953

2,646,357

UNITED STATES PATENT OFFICE 2,646,357

PACKAGE

Oscar E. Seiferth, Madison, Wis., assignor to Oscar Mayer & Co., Inc., Chicago, Ill., a corporation of Illinois Application April 12, 1950, Serial No. 155,512

14 Claims. (Cl. 99—174)

This invention relates to packaging and is more particularly concerned with the fabrication of a package containing a plurality of links of sausage or a similar product, arranged in juxtaposed relation on opposite sides of an intermediate portion of a paperboard backing member which is folded to hold the links thereon in compact relation.

It is a general object of the invention to provide a neat and compact package containing a predetermined quantity of sausage or a similar product, wherein the sausage is in the form of links which are assembled in side by side relation on opposite sides of a portion of a paperboard backing member, the backing member being thereafter folded to partially enclose the sausage links and to retain the links in assembled relation thereon.

It is a more specific object of the invention to provide a package of link sausages which is formed by cutting and creasing a paperboard backing member to provide an intermediate panel on opposite sides of which a plurality of links of sausages are adapted to be arranged in juxtaposed relation and to provide side wall and bottom wall forming panels adapted to be folded around the sausages on one face of the package, the backing member being also cut to provide a relatively narrow strap-like member which is adapted to be folded over the central portion of the sausages on the other face of the package.

It is a further object of the invention to provide a package of link sausages in which a predetermined weight of sausage meat, divided into connected links, is arranged with the links in juxtaposed relation on opposite sides of an intermediate portion of a paperboard backing member, the backing member being provided with a cut-out strap portion which is folded in confining relation over the outer face of the sausages on one side of the package and the end portions of the backing member being folded over the sausages on the other side of the package in side wall and bottom enclosing relation with one of the side wall forming portions being interlocked with the end of the strap portion.

It is another object of the invention to provide a package of the type described wherein the sausage links are assembled with the backing member, the backing member is folded around the links and a transparent sheet material is wrapped around the same to retain the links and the backing member in assembled relation while permitting visual inspection of a substantial portion of the sausage.

It is a further object of the invention to provide a package of the type described wherein the sausage may be formed into links as it is assembled with the backing member.

These and other objects of the invention will be apparent from a consideration of the packages which are shown by way of illustration in the accompanying drawings wherein:

Fig. 1 is a perspective view of a package embodying the principles of the invention;

Fig. 2 is an end elevation thereof;

Fig. 3 is an elevation of the side opposite that shown in Fig. 1;

Fig. 4 is a perspective view of the paperboard backing member which forms the framework of the package with the sausages removed;

Fig. 5 is a plan view of the paperboard backing member from which the package is fabricated;

Fig. 6 is a perspective view similar to Fig. 1 of a modified form of the package; and Fig. 7 is a plan view of the backing member which is employed in forming the package shown in Fig. 6.

Referring to Figs. 1 to 5 of the drawings, there is illustrated a package having incorporated therein the principal features of the invention which comprises a backing member 10 and a plurality of connected sausage links 11 enclosed in a transparent overwrap 12.

The backing member 10 is preferably formed of paperboard or similar material, provided with a suitable wax coating or the like and having space for printed matter such as advertising or instructions for the preparation of the sausage.

The backing member or blank 10 is generally rectangular in form and creased or scored transversely along the parallel lines 13, 14, 15 and 16 to divide the blank into an intermediate central panel 17 extending between the spaced crease lines 14 and 15, two spaced side wall forming panels 18 and 19 extending between the crease lines 13, 14 and 15, 16, respectively, and two end or bottom forming flaps 20 and 21 which extend from the outer crease lines 13 and 16 to the end edges 22 and 23 of the blank 10. An elongate, relatively narrow, strap-like member 24 is die cut from the central panel 17 and the adjoining side wall and end panels 19 and 21. The body of the member 24 is formed by cutting along the generally parallel longitudinally extending lines 25 and 26. The end portion 27 of the member 24 is formed by cutting along the transverse end cutting line 28 which is longer than the width of the body of the member 24, the short longitudinal lines 29, 30 which extend inwardly from the ends of the cutting line 28 and the transverse cutting lines 31, 32 which extend between the inner ends of the cutting lines 29, 30 and the outer ends of the cutting lines 25, 26. This provides an end formation 27 on the member 24 which is somewhat wider than the body of the member, having laterally extending portions 33, 34 which are adapted to form locking elements thereon. The strap member is adapted to fold at the inner end about the transverse crease line 14. A transverse crease line 35 extends across the strap member 24 in spaced relation to the crease line 14, the distance between crease line 14 and crease lines 13 and 35 being approximately the same. The transverse crease line 16 extends across the end of the strap member 24 along the line 36 adjacent the end portion 27. The space between the line 36 and the cutting lines 31, 32 is approximately the same distance longitudinally of the blank as the space between the crease lines 16 and 15, the latter being interrupted at the cutting lines 25, 26.

The blank 10 is provided along its longitudinally extending side edges 37 and 38 with oppositely disposed, longitudinally spaced, inwardly extending semi-circular slots 39 and 40. In the illustrated form four slots 39 are provided along the edge 37 while three slots 40 and a T-shaped cut 41 are provided along the side edge 38. The T-shaped cut 41 is in approximate transverse alignment with the end slot 39 on the opposite side edge 37 of the blank 10 and the three slots 40 are in transverse alignment with the remaining three slots 39.

In forming the package a plurality of links of sausage 11, preferably of a predetermined weight, as for example, a half pound, are arranged on opposite faces of the central panel 17 of the blank 10, the strap member 24 being folded back towards the end flap 20 about the crease line 14. The sausage links 11 may be formed as they are applied to the blank 10 or they may be pre-formed and wound about the same with the connecting portions 42 between the respective sausages engaged in the slots 39 and 40 along the opposite edges of the panel 17, the initial loose end portion 43 of the sausage casing being engaged in the T-shaped cut 41 and the sausages being arranged in two layers of four sausages each on opposite sides of the panel 17. After the sausage links 11 are properly positioned on opposite sides of the panel 17 the strap member 24 is folded back about the crease lines 35 and 36 across the top or outer face of the top layer of sausages 11. The end 27 of the strap member 24 with its lateral extensions 33 and 34 is engaged in the aperture defined by the cutting lines for the strap member 24, the edges formed by the cutting lines 31, 32 being approximately aligned with the transverse crease line 16. The side panels 18, 19 and end panels 20, 21 are then folded around the bottom layer of sausages 11 bringing the end portions thereof into overlapped relation. With the sausages 11 held in position by strap member 24 and side and bottom wall members 18, 19 and 20, 21 the entire assembly is wrapped in a transparent sheet forming an overwrap 12.

In the final form of the package the panels 18 and 19 form side walls for the bottom layer of sausages. The portion of the strap member 24 between the crease lines 14 and 35 forms one side wall for the top layer of sausages while the portion of the same which extends from the crease line 36 to the end thereof forms the opposite side wall with the end portion 27 extending inside of and along the bottom side wall 19. The entire assembly or unit is completely enclosed in the transparent wrapper 12 with substantial portions of the sausages 11 visible through the wrapper. Advertising and other marking may be applied to the visible portions of the blank 10, particularly the strap member 24, which has a band-like appearance when viewed from the top of the package. The package is generally rectangular and a plurality of the packages may be readily stacked for display or shipment.

In Figs. 6 and 7 a modified form of the package is illustrated. In this form a blank 50 is die cut and creased in the same manner as blank 10 to provide an intermediate panel 51, side wall forming panels 52, 53, bottom flap forming panels 54, 55 and a central strap member 56 having a locking tab end formation 57. The sausages 58 are pre-formed and disconnected at the ends. A predetermined number of sausages 58, for example, four, as shown, are arranged in top and bottom row forming side-by-side relation on opposite sides of the central panel 51. The strap member 56 is folded about the top row of sausages 58 and the locking end formation is engaged along the inside of the side wall formed by panel 52. The blank end panels 54 and 55 are folded about the bottom row of sausages 58 and the assembled unit is then overwrapped with a transparent wrapper 59. The resulting package differs from the form shown in Figs. 1 to 5 in the omission of slots 39, 40 and slit 41 which are not required for the disconnected links 58. The sausages 58 are retained in assembled relation with the paperboard blank 50 by the folded portions of the blank.

While the invention is illustrated in connection with the packaging of sausages it will be understood that it is not intended to limit the same to a particular product. Other products of a similar nature may be packaged in the same manner. Also, while specific materials and details of construction are referred to in describing the illustrated forms of the invention, other materials and other details of construction may be resorted to within the spirit of the invention.

I claim:

1. A package of connected link sausages comprising a backing member formed of paperboard and having a central portion on opposite faces of which a plurality of sausage links are arranged in side-by-side row forming relation, integral side wall forming members extending along the end sausages in the one row of said sausages, bottom forming flaps extending along the outer face of said one row of sausages, a top strap member of substantially less width than said central portion of said backing member extending over the row of sausages on the opposite face of said central portion and connected at opposite ends to the side edges of said central portion, said central portion of said backing member being provided with spaced, relatively shallow, inwardly extending slots along the end edges thereof adapted to accommodate the connecting casing areas between said sausages, and an outer wrapping member enclosing said backing member and said sausages.

2. A package of connected link sausages comprising a backing member formed of paperboard and having a central portion on opposite faces of which a plurality of sausage links are arranged in side-by-side row forming relation, integral side wall forming members extending along the end sausages in the one row of said sausages, bottom forming flaps extending along the outer face of said one row of sausages, a top strap member of substantially less width than said central portion of said backing member extending over the row of sausages on the opposite face of said central portion and connected at opposite ends to the side edges of said central portion, said central portion of said backing member being provided along opposite end edges thereof with spaced inwardly extending recesses for accommodating the connecting casing between the sausages and one end edge having a slit for receiving the end of the casing, and an outer wrapping member enclosing said backing member and said sausages.

3. A meat package which comprises a supporting member of relatively thin, flat, stiff material, a plurality of connected sausage links arranged in side-by-side row forming relation on opposite faces of said supporting member with the casing areas connecting adjoining links being reversely bent around opposite edges of the supporting member and with successive links being arranged alternately on opposite faces of said supporting member, a covering member of relatively stiff material arranged over one outer face of the sausages, a relatively narrow strap member extending across the other outer face of the sausages, and a transparent wrapper enclosing the sausages, the covering member and the strap member.

4. A package of linked sausages comprising a paperboard backing member having a central panel forming portion, a plurality of connected sausage links arranged in side-by-side row forming relation on said panel portion, the casing areas connecting adjoining links being reversely bent around opposite side edges of said panel portion with successive links arranged alternately on the opposite faces thereof, end wall forming members integral with said panel portion extending along the end sausages in the one row of said sausages, bottom forming flaps integral with said side wall members extending along the outer face of said row of sausages, a strap member of substantially less width than said panel portion extending over the row of sausages on the opposite face of said panel portion, said strap member being integrally connected at one end to a side edge of said central panel and being separably connected at the other end to the opposite side edge thereof with the adjacent end portions of said strap member being in approximate alignment with said end wall forming members.

5. A package of relatively small elongate articles of meat material arranged in side-by-side row forming relation comprising a backing member of paperboard creased and folded to provide a central panel, side forming panels and bottom forming end flaps, said side forming panels and bottom forming flaps being folded around a bottom row of said articles arranged on one face of said central panel to retain said articles in row formation on said central panel, and a relatively narrow strap member formed by a generally U-shaped cut in the central portion of said backing member, said strap member being folded over a top row of articles arranged on the opposite face of said central panel and said strap member being formed at its free end with a locking formation for interlocking engagement with a side forming panel of said backing member whereby to retain said top row of articles on said central panel.

6. A meat package which is characterized by a generally rectangular supporting member of relatively thin, flat, stiff material and a plurality of connected stuffed meat links arranged in side-by-side row forming relation on opposite faces of said supporting member, with the casing areas connecting the individual links being positioned along opposite marginal side edges of the supporting member, a covering member positioned on the outer face of one row of said links and a relatively narrow strap member positioned on the outer face of the other row of said links, with the ends of said covering member and said strap member extending from opposite end edges of said supporting member.

7. A package comprising a paperboard backing member, a plurality of connected link sausages, each of said sausages being of a length substantially the same as one dimension of the backing member and said sausages being arranged in parallel row forming relation on opposite faces of said backing member, the connected ends of adjoining sausages being positioned at the edge of the backing member, a paperboard covering member arranged over one outer face of the sausages, a relatively narrow paperboard strap member arranged over the other outer face of the sausages and a transparent covering wrapper enclosing the sausages and said members whereby the sausages are held in position on the backing member.

8. A method of forming and wrapping sausage links which comprises winding a continuous length of filled sausage casing about a generally rectangular blank of relatively stiff material, simultaneously forming said filled casing into a series of connected sausage links of uniform length, which length is approximately the same as the lineal dimension of the blank about which the casing is wound with the connecting areas between the links arranged along opposite marginal edges of the blank, and enclosing the assembled links and supporting blank in an outer transparent wrapper.

9. A method of forming sausage into links and wrapping the same, comprising winding a continuous length of filled sausage casing about a generally rectangular supporting member of relatively thin flat material and simultaneously forming the filled casing into a series of connected sausage links of a length approximately equal to the lineal dimension of the supporting member about which the casing is being wound, with the connecting areas of the casing between adjacent sausages being located along opposed marginal edges of the supporting member, covering one of the exposed faces of the sausages with a stiffening member and enclosing the sausages and the stiffening member in an outer wrapper.

10. A method of forming a package of sausage links which comprises rotating a generally rectangular supporting blank to wind thereabout a predetermined length of filled sausage casing, simultaneously forming the casing into a plurality of individual sausage links and arranging said links in side-by-side row forming relation on the supporting blank with the areas of the casing connecting said links arranged along opposite marginal edges of the supporting blank, covering the row of links on one side of the supporting member with a backing member and enclosing the assembled links and backing member in an outer wrapper.

11. A method of forming sausage into links and wrapping the same, comprising winding a continuous length of filled sausage casing about a central supporting panel portion of a relatively thin, generally rectangular, flat blank of paperboard material and simultaneously forming the filled sausage into a series of connected sausage links of a length approximately equal to the lineal dimension of the supporting panel about which the casing is being wound, with the connecting areas of the casing between adjacent sausages being located along opposite marginal side edges of the supporting panel and with the sausages arranged in side-by-side row formation on opposite faces of the supporting panel, folding end panel portions of the blank to bring the same into overlapping relation on the exposed faces of the row of sausages on one face of the supporting panel and inclosing the folded blank and the sausages in an outer wrapper.

12. A paperboard blank for use in packaging a plurality of elongate articles having the general form of sausages, said blank being generally rectangular in form and having a width approximately the same as the length of the articles to be packaged, said blank having a plurality of longitudinally spaced transverse crease lines dividing the same into a central panel, two side panels and two end panels, said central panel being adapted to receive in row formation on opposite faces thereof a predetermined number of the articles, said side panels and said adjoining end panels being adapted to be folded around a row of the articles when they are arranged on said central panel in the assembled package, said central panel, an adjoining side panel and an adjoining end panel of said blank being cut on lines which define a relatively narrow strap member extending longitudinally of the blank from one transverse edge of the central panel across said central panel, said adjoining side panel and into said adjoining end panel, said strap member being hingedly joined at said transverse edge of said central panel and having a free end in said last mentioned end panel and said strap member being of a length sufficient to extend around an opposite row of the articles arranged on said central panel in the assembled package.

13. A paperboard blank as defined in claim 12 and said strap member having longitudinally spaced transverse crease lines dividing said strap member into a central portion and adjoining end portions, the crease line at the free end of said strap member being aligned with the crease line separating the end panel of the blank from the adjoining side panel and the crease line at the other end of said strap member being parallel with the crease line dividing the central panel of the blank from the adjoining side panel and being spaced inwardly therefrom a distance approximately the same as the distance between the crease lines defining said side panel.

14. A paperboard blank for use in packaging a plurality of elongate articles having the general form of sausages, said blank being generally rectangular in form and of a width corresponding approximately to the length of the articles which are to be packaged therewith, said blank having parallel transverse crease lines spaced longitudinally of the blank and dividing the same into a central panel, two adjoining side wall forming panels and two opposite end panels, said blank including a relatively narrow longitudinal strap member extending from a crease line defining a transverse edge of said central panel along which said strap member is hingedly joined and terminating with a free end in an end panel, said strap member being formed by cutting lines in the blank which are spaced inwardly of the side edges and one end edge of the blank, said cutting lines having longitudinal portions traversing the entire central panel and one adjoining side wall forming panel and extending into said last mentioned end panel, and said cutting lines having transversely extending portions in said last mentioned end panel cooperating with longitudinal portions thereof to provide a widened portion on the free end of said strap member.

OSCAR E. SEIFERTH.

References Cited in the file of this patent

UNITED STATES PATENTS

| Number | Name | Date |
| --- | --- | --- |
| 1,053,711 | Crankshaw | Feb. 18, 1913 |
| 1,213,455 | Burke | Jan. 23, 1917 |
| 1,616,708 | Tanner | Feb. 8, 1927 |
| 1,710,386 | Taylor | Apr. 23, 1929 |
| 1,945,669 | Vogt | Feb. 6, 1934 |
| 1,957,256 | Frey | May 1, 1934 |
| 1,983,681 | Seaver | Dec. 11, 1934 |
| 2,211,340 | Mehrkens | Aug. 13, 1940 |
| 2,365,887 | Lind | Dec. 26, 1944 |

FOREIGN PATENTS

| Number | Country | Date |
| --- | --- | --- |
| 549,188 | Great Britain | Nov. 10, 1942 |